United States Patent
Lin

(10) Patent No.: US 10,049,433 B2
(45) Date of Patent: Aug. 14, 2018

(54) FACIAL IMAGE ADJUSTMENT METHOD AND FACIAL IMAGE ADJUSTMENT SYSTEM

(71) Applicant: HTC Corporation, Taoyuan (TW)

(72) Inventor: Cheng-Hang Lin, Taoyuan (TW)

(73) Assignee: HTC Corporation, Taoyuan (TW)

(*) Notice: Subject to any disclaimer, the term of this patent is extended or adjusted under 35 U.S.C. 154(b) by 0 days.

(21) Appl. No.: 15/073,628

(22) Filed: Mar. 17, 2016

(65) Prior Publication Data

US 2017/0069065 A1  Mar. 9, 2017

(30) Foreign Application Priority Data

Sep. 8, 2015 (TW) .............................. 104129672 A

(51) Int. Cl.
*G09G 5/00* (2006.01)
*G06T 5/00* (2006.01)

(52) U.S. Cl.
CPC ...... *G06T 5/00* (2013.01); *G06T 2207/30201* (2013.01)

(58) Field of Classification Search
None
See application file for complete search history.

(56) References Cited

U.S. PATENT DOCUMENTS

| 2008/0267443 | A1 | 10/2008 | Aarabi |  |
|---|---|---|---|---|
| 2010/0026833 | A1 | 2/2010 | Ciuc |  |
| 2011/0064281 | A1* | 3/2011 | Chan | ............... G06Q 50/01 382/118 |
| 2012/0299945 | A1* | 11/2012 | Aarabi | ............... G06T 11/60 345/589 |

FOREIGN PATENT DOCUMENTS

| CN | 101930535 A | 12/2010 |
| TW | 201035876 A | 10/2010 |
| TW | 201101815 A | 1/2011 |
| TW | 201413649 A | 4/2014 |

OTHER PUBLICATIONS

Corresponding Taiwanese Office Action that these art references were dated Oct. 27, 2016.
Corresponding Taiwanese Office Action dated Jul. 21, 2016.

* cited by examiner

*Primary Examiner* — Xiao Wu
*Assistant Examiner* — Mohammad H Akhavannik
(74) *Attorney, Agent, or Firm* — CKC & Partners Co., Ltd.

(57) ABSTRACT

The invention provides a facial image adjustment system and a facial image adjustment method. The facial image adjustment method comprises following steps: obtaining a image file; storing at least one known facial image and at least one adjustment parameter set corresponding to the at least one known facial image; and adjusting a first initial facial image corresponding to the at least one known facial image according to the at least one adjustment parameter set of the at least one known facial image in respond to recognize the image file comprising the first initial facial image corresponding to the at least one known facial image, so as to output a post-production facial image.

15 Claims, 8 Drawing Sheets

FACIAL IMAGE ADJUSTMENT METHOD AND FACIAL IMAGE ADJUSTMENT SYSTEM

RELATED APPLICATIONS

This application claims priority to Taiwanese Application Serial Number 104129672, filed Sep. 8, 2015, which is herein incorporated by reference.

BACKGROUND

Field of Invention

The present invention relates to a facial image adjustment method and a facial image adjustment system. More particularly, the present invention relates to a facial image adjustment method and a facial image adjustment system of recording the user behavior and applying the facial identification.

Description of Related Art

The image manipulation software and the application program of beauty the facial features are becoming increasingly popular. The user can easily selects the beauty effect, such as applying the thinner face effect, skin whitening effect, buffing effect, despeckle effect, removing acne effect to the facial image by the image manipulation software and outputting the manipulated facial image.

However, the user still needs to repeatedly manipulate each image or repeatedly select effects to achieve the expected beauty effect, even these multiple images corresponding to the same user. In this way, the repeated operations always cause the inconvenience when the user manipulates the image.

SUMMARY

The invention provides a facial image adjustment system. The facial image adjustment system comprises an image capturing device, a storage module, and a processing module. The image capturing device uses for obtaining a image file. The storage module is coupled to the image capturing device. And, the storage module uses for storing at least one known facial image and at least one adjustment parameter set corresponding to the at least one known facial image. The processing module is coupled to the image capturing device and the storage module. Wherein in respond to the first initial facial image corresponding to the at least one known facial image is recognized from the image file, the processing module adjusts the first initial facial image corresponding to the at least one known facial image according to the at least one adjustment parameter set of the at least one known facial image, so as to output a post-production facial image.

On another aspect, the invention provides a facial image adjustment method. The facial image adjustment method comprises following steps: obtaining a image file; storing at least one known facial image and at least one adjustment parameter set corresponding to the at least one known facial image; and adjusting a first initial facial image corresponding to the at least one known facial image according to the at least one adjustment parameter set of the at least one known facial image in respond to recognize the image file comprising the first initial facial image corresponding to the at least one known facial image, so as to output a post-production facial image.

Through the facial image adjustment system and facial image adjustment method, the facial image adjustment system can recognize the known facial image from the image file and apply the preferring manipulation configuration to the known facial image, so as to decrease the inconvenience causing by the repeated operations when the user manipulates multiple images.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
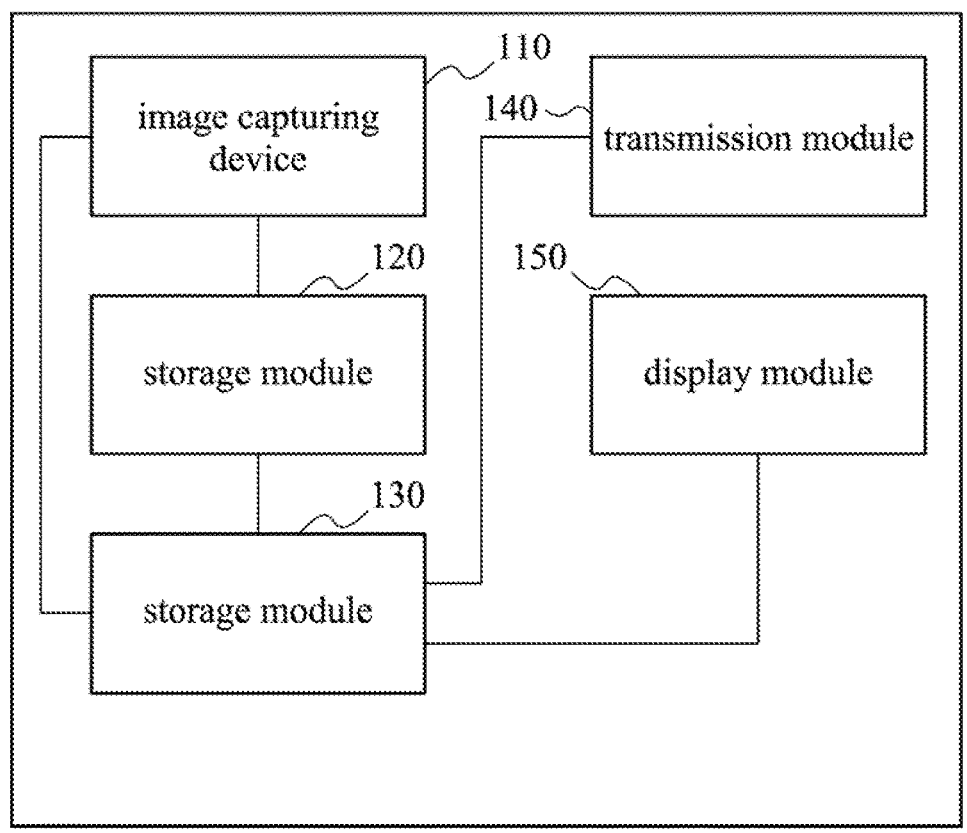
FIG. 1 illustrates a block diagram of a facial image adjustment system according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Reference is made to FIG. 1, FIG. 1 illustrates a block diagram of a facial image adjustment system 100 according to an embodiment of the present invention. As shown in FIG. 1, the image adjustment system 100 includes an image capturing device 110, a storage module 120, a processing module 130, a transmission module 140 and a display module 150. The storage module 120 coupled to the image capturing device 110 and the storage module 120. The processing module 130 coupled to the image capturing device 110 and the storage module 120. The transmission module 140 and the display module 150 coupled to the processing module 130. In each embodiment of the invention, the image capturing device 110 uses for capturing the image. The image capturing device 110 can be implemented by charge coupled device (CCD) or complementary metal-oxide semiconductor (CMOS). The storage module 120 uses for storing data. The storage module 120 can be implemented by memory, hard disk, memory card, etc. The processing module 130 can use for processing any kind of calculations. The processing module 130 can be implemented a micro controller, a microprocessor, a digital signal processor, an application specific integrated circuit (ASIC), a firmware, a program, or a logical circuitry. In one embodiment, the transmission module 140 and the display module 150 can selectively be implemented according to the practical applications. In the following paragraphs, the facial image adjustment system 100 shown in FIG. 1 will be used as an example to describe the facial image adjustment method 200 shown in FIG. 2 according to the embodiment of the present disclosure.

Figure 2:
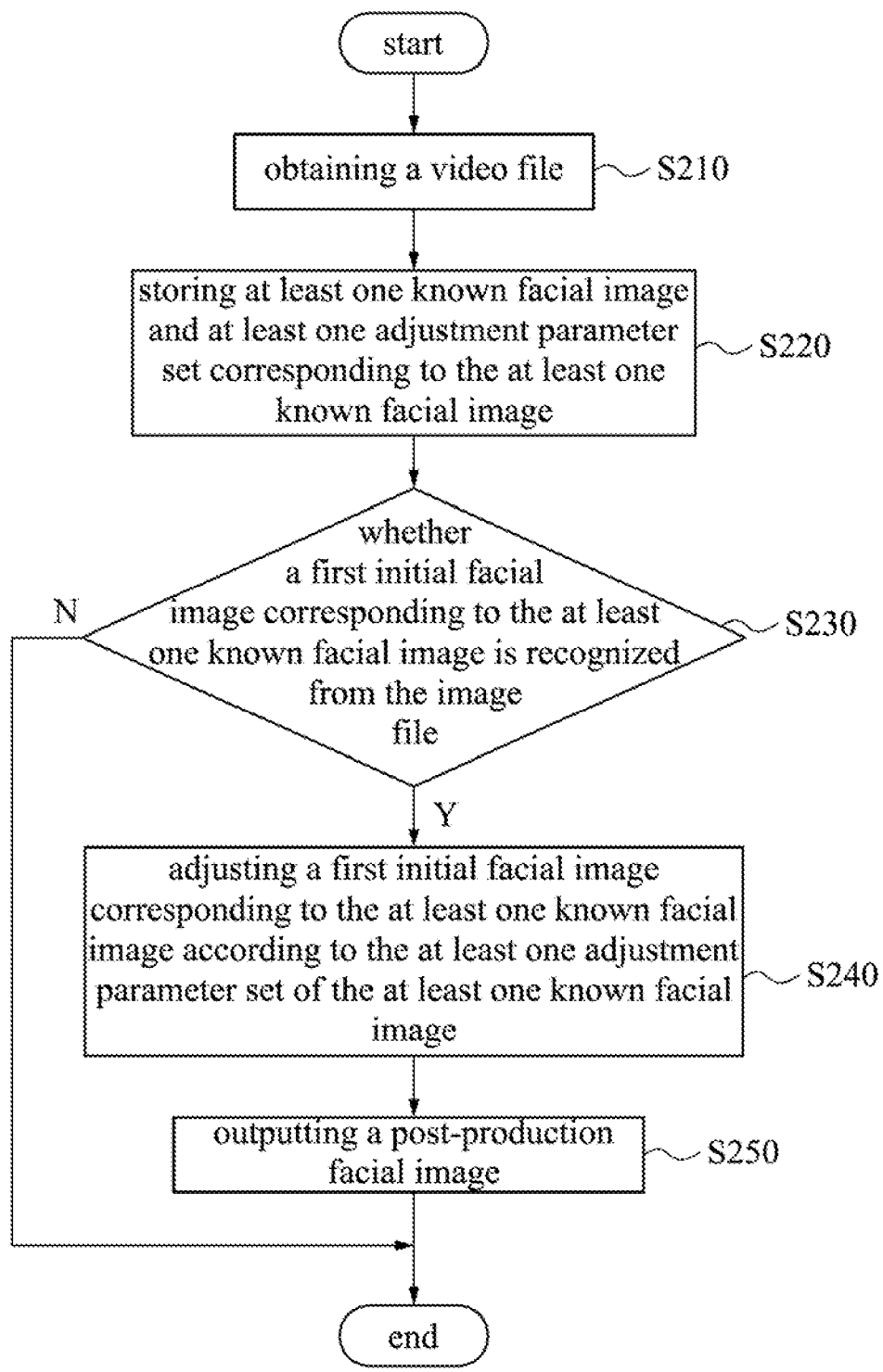
FIG. 2 illustrates a flow chart of a facial image adjustment method according to an embodiment of the present invention.

FIG. 2 illustrates a flow chart of a facial image adjustment method according to an embodiment of the present invention. The facial image adjustment method 200 can be applied by the similar or the same system structure as the facial image adjustment system 100 shown in FIG. 1. To simplify the description below, the embodiment describes the method by the facial image adjustment system 100 shown in FIG. 1 as an example. However, the present disclosure is not limited thereto.

It should be noticed that the facial image adjustment method 200 can be implemented by the facial image adjustment system 100 and also can be implemented by a computer program stored in a non-transitory computer readable storage medium to make the mobile device, computer or the electric device to read the facial image adjustment method 200 of the storage medium. The computer program can be stored in a non-transitory computer readable medium such as a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this invention pertains.

In addition, it should be noted that, in the steps of the following the facial image adjustment method 200, no particular sequence is required unless otherwise specified. Moreover, the following steps also may be performed simultaneously or the execution times thereof may at least partially overlap.

Furthermore, the steps of the following the facial image adjustment method 200 may be added, replaced, and/or eliminated as appropriate, in accordance with various embodiments of the present disclosure.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the embodiments.

In this embodiment, the facial image adjustment method 200 includes the steps below.

In step S210, the image capturing device 110 is configured for obtaining a video file. For example, the image capturing device 110 placed in mobile device adopts the front camera to capture the user's face or adopts the rear camera to capture other people's face.

In step S220, the storage module 120 is configured for storing at least one known facial image and at least one adjustment parameter set corresponding to the at least one known facial image. In one embodiment, the storage module 120 coupled to the image capturing device 110 and the step S220 can be performed before or after the step S210.

For example, the storage module 120 can pre-store the at least one known facial image before obtaining the image file. And, the storage module 120 records the at least one adjustment parameter set corresponding to the at least one known facial image. In one embodiment, the at least one adjustment parameter includes the brightness parameter value for adjusting the skin color, a smoothing parameter value for adjusting the smoothing level of face, a coloring parameter value for adjusting the complexion of face, bigger eyes parameter, removing acne parameter, despeckle parameter, face shape parameter, etc. The effects corresponding to these adjustment parameter can be implemented by many kinds of known image processing algorithm, such as image filtering algorithm, smoothing image algorithm, etc. Persons of ordinary skill in the art can easily apply these known algorithms related to the image processing. Therefore, it will not further discuss here. Through applying these adjustment parameters to adjust the face images, it can achieve the effect of beautifying the face images. In one embodiment, the facial image adjustment system 100 can record the adjustment parameters selected by each user after each operation to generate the adjustment parameter set. Or, the adjustment parameter set can be generated according to the stored manual configurations of the user.

In step S230, the processing module 130 is configured to determine whether a first initial facial image corresponding to the at least one known facial image is recognized from the image file. If the processing module 130 determines that the first initial facial image corresponding to the at least one known facial image is recognized from the image file, the step S240 is performed. If the processing module 130 does not determine that the first initial facial image corresponding to the at least one known facial image is recognized from the image file, the procedure is ended.

Because of the same person usually has the fixed facial characteristic, the processing module 130 can recognize that whether the image file includes the first initial facial image corresponding to the at least one known facial image by a facial characteristic recognition. In one embodiment, the facial characteristic can be an inner side distance of eyes, a left side and right side distance of nose, a freckle position or a left side and right side distance of mouth corner. For example, the processing module 130 determines that the freckle position and the left side and right side distance of nose correspond to a facial image data stored in the storage module 120, the first initial facial image is determined as the known facial image.

In this way, the processing module 130 can recognize that whether the first initial facial image corresponds to the at least one known facial image stored in the storage module 120 according to the at least one facial characteristic of the first initial facial image.

In another embodiment, if the image file includes multiple facial images, wherein a part of these facial images belongs to the known facial image and another part of these facial images belongs to the unknown facial image, the user can select the facial image, which he/she wants to manipulate through the user interface. Then, in step S230, the processing module 130 recognizes that whether the selected facial image belongs to the known facial image.

In step S240, the processing module 130 adjusts a first initial facial image corresponding to the at least one known facial image according to the at least one adjustment parameter set of the at least one known facial image.

In one embodiment, the processing module 130 coupled to the image capturing device 110 and the storage module 120. While the processing module 130 recognizes the initial facial image as a known facial image, it is determined that the storage module 120 exists the at least one adjustment parameter set of this facial image. Therefore, the facial image of the user can be adjusted automatically according to the pre-stored adjustment parameter set corresponding to the facial image. Or, the processing module 130 can recommend the preferring adjustment parameter set of the user to configure the manipulation. It can help the manipulation steps simpler.

In general, the manipulation behavior of each user is relatively fixed. For example, the manipulation behavior of a user is to manipulate the eyes bigger and the manipulation behavior of another user is to remove the freckle. For instance, the storage module 120 exists an adjustment parameter set corresponding to the facial image. When the smoothing parameter value of the adjustment parameter set is configured as 50%, and the bigger eyes parameter value of the adjustment parameter set is configured as 20%, the processing module 130 automatically configures the smoothing effect and the bigger eyes effects to the facial image or recommends user to apply the smoothing effect and the bigger eyes effects to the facial image according to these adjustments parameters.

Next, in step S250, the processing module 130 outputs a post-production facial image. In one embodiment, the processing module 130 displays the facial image, which is applied the adjustment parameter set, on the display module 150.

Based on above steps, a known face can be recognized by the image adjustment system 100 and the facial image adjustment method 200 to help user easily apply the pre-stored adjustment parameter set, so as to achieve the manipulation purpose. After the processing module 130 recognizes the known face, the pre-stored adjustment parameter set can be applied automatically for manipulating image by recording the manipulation behavior of the user. Or, the processing module 130 can recommend a preferring adjustment parameter value for generating the post-production facial image after the processing module 130 recognize the known face. As such, the user does not need to manually adjust many kinds of adjustment parameter values to each image while the user is the same person.

Figure 3A:
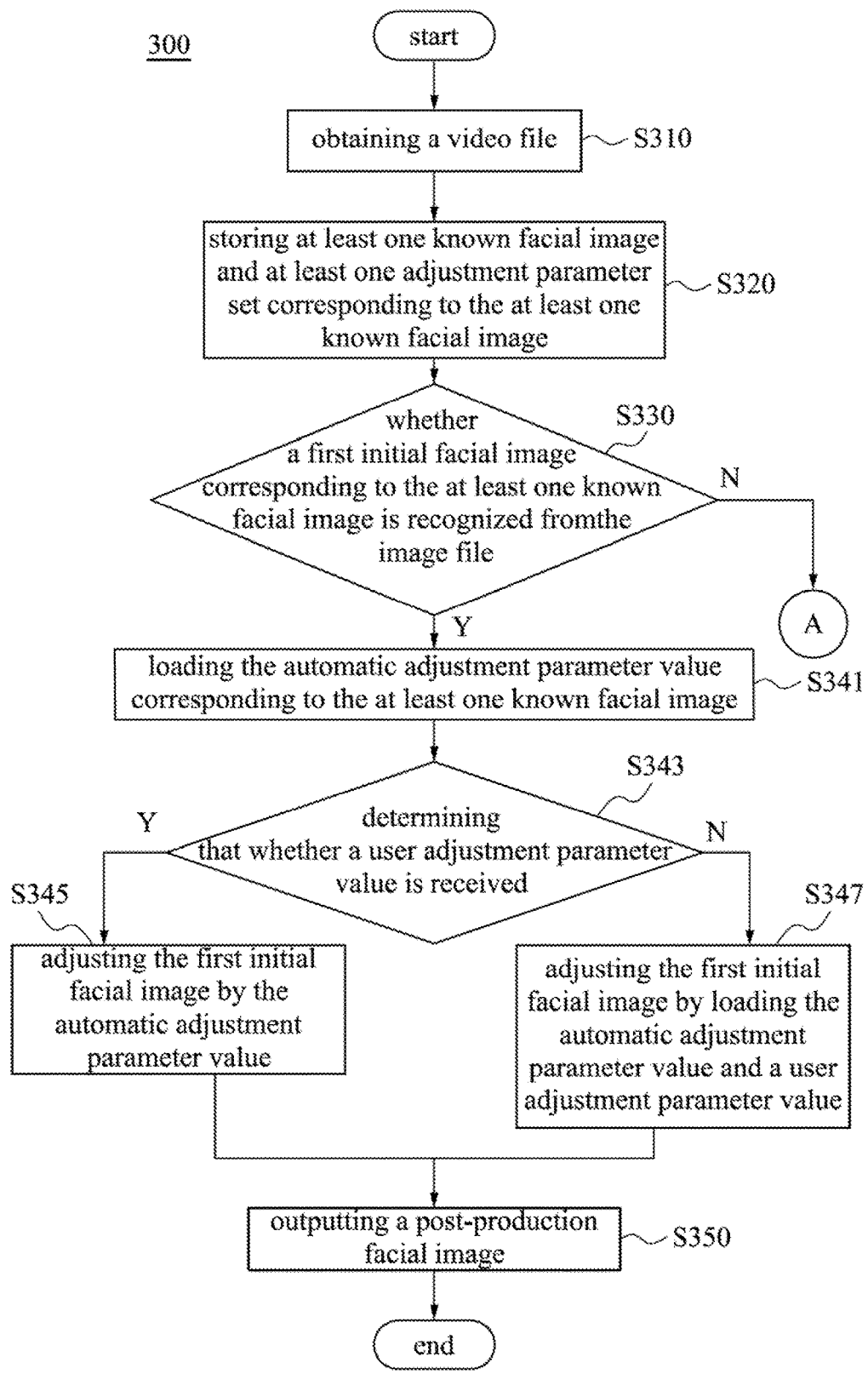
FIGS. 3A-3B illustrate flow charts of facial image adjustment method according to an embodiment of the present invention.
Figure 3B:
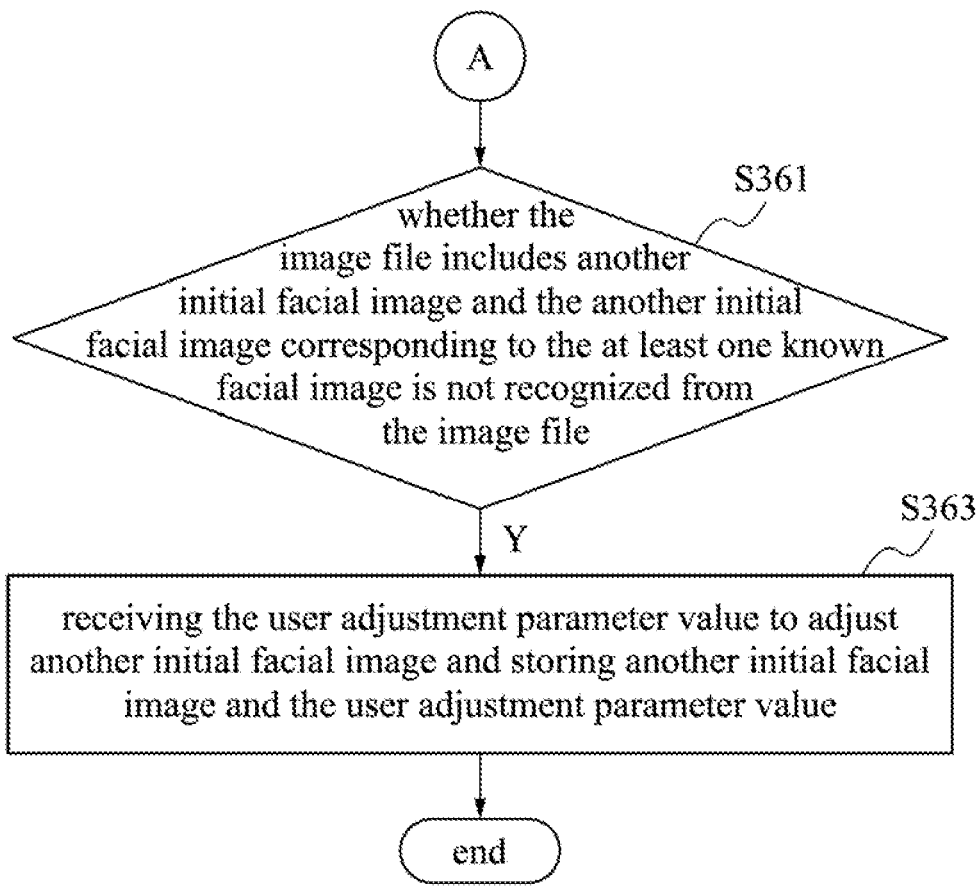
Figure 4A:
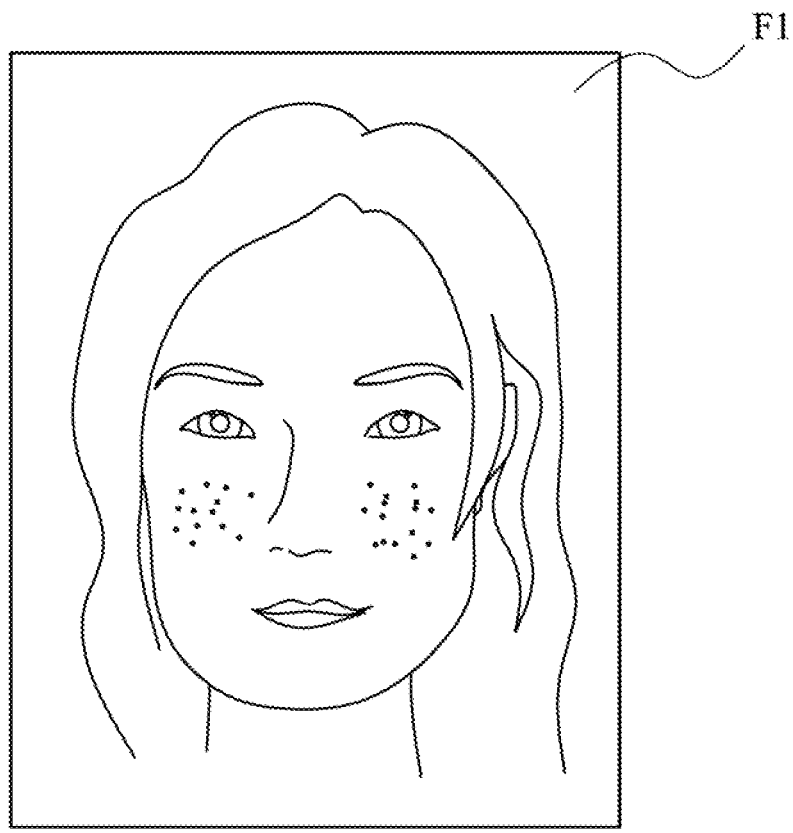
FIGS. 4A-4C illustrate schematic diagrams of user interfaces for the facial image adjustment method according to an embodiment of the present invention.
Figure 4B:
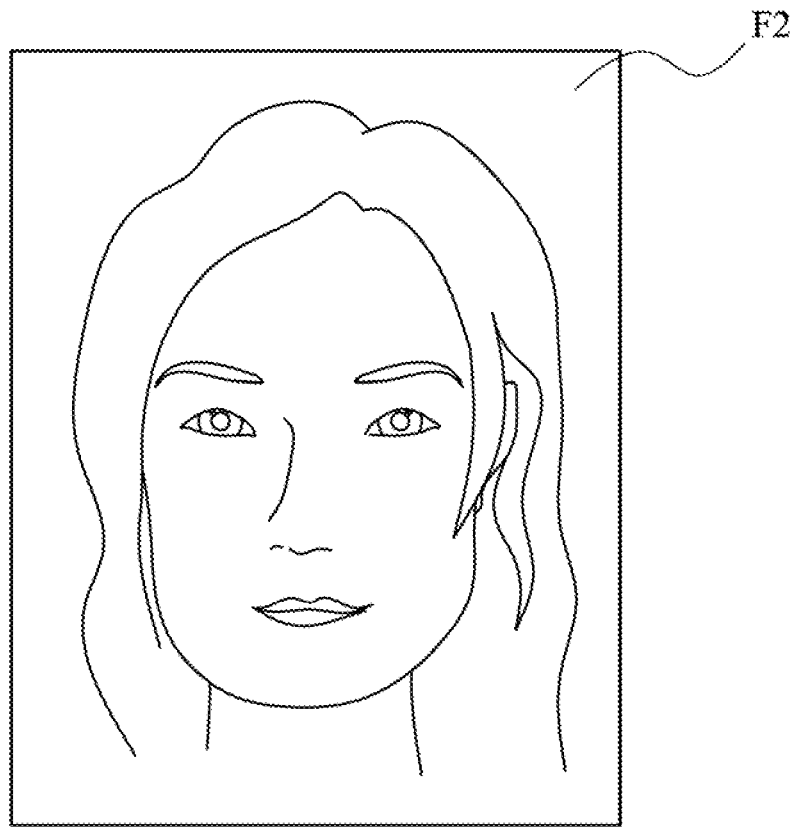
Figure 4C:
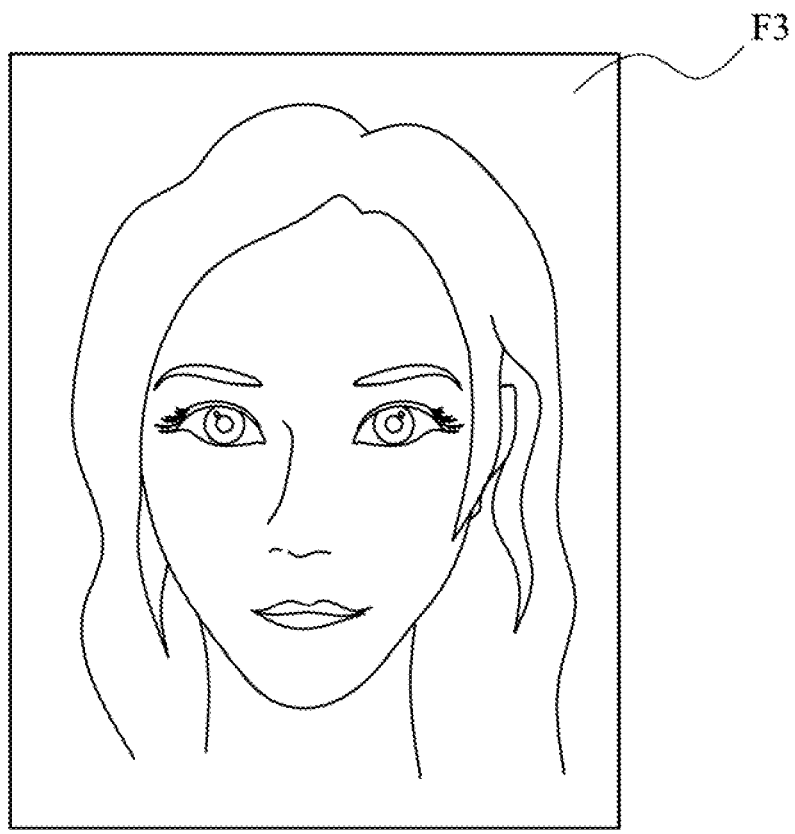

Next, please refer to FIGS. 3A-3B and 4A-4C. FIGS. 3A-3B illustrate flow charts of a facial image adjustment method 300 according to an embodiment of the present invention. FIGS. 4A-4C illustrate schematic diagrams of user interfaces for the facial image adjustment method 300 according to an embodiment of the present invention. To simplify the description below, in the following paragraphs, the facial image adjustment method 300 shown in FIGS. 3A-3B will be described with the user interfaces shown in FIGS. 4A-4C.

In the embodiment, the adjustment parameter set can include automatic adjustment parameter value or a user adjustment parameter value, or adopting both automatic adjustment parameter value and a user adjustment parameter value in the same time. In addition, the automatic adjustment parameter value or the user adjustment parameter value includes at least one adjustment parameter value.

Wherein, the steps S310-S330, S350 in FIG. 3A-3B are separately the same as the steps S210-S230, S250. Therefore, the following paragraphs will not describe these steps in detail.

In step S330, after the processing module 130 determines that the first initial facial image corresponding to the at least one known facial image is recognized from the image file (e.g. as shown in FIG. 4A), the step S341 is performed. If the processing module 130 does not determine that the first initial facial image corresponding to the at least one known facial image is recognized from the image file, the step S361 is performed, as shown in FIG. 3B. The step S361 will be described in later paragraphs of the description.

In step S341, the processing module 130 reads the automatic adjustment parameter value of the first initial facial image corresponding to the at least one known facial image from the storage module 120 and loads the automatic adjustment parameter value corresponding to the at least one known facial image. In one embodiment, the automatic adjustment parameter value can be at least one adjustment parameter value which user preferred or frequently used corresponding to the known facial image. In addition, the at least one adjustment parameter value can be pre-stored in the storage module 120. For example, a facial removing freckle parameter value.

In step S343, the processing module 130 determines that whether a user adjustment parameter value is received. If the processing module 130 determines that the user adjustment parameter value is received, the step S345 is performed. If the processing module 130 determines that the user adjustment parameter value is not received, the step S347 is performed. In one embodiment, the processing module 130 can receive the user adjustment parameter value corresponding to the facial image, which is currently inputted by the user through the user interface. For instance, the user can input a face shape parameter value and a bigger eyes parameter value. In this manner, the user can flexibly and slightly adjust the manipulation effect for the current facial image by manual input method.

In step S345, the processing module 130 adjusts the first initial facial image by loading the automatic adjustment parameter value and/or a user adjustment parameter value upon the processing module 130 determines that the user adjustment parameter value is received. In one embodiment, as shown in FIG. 4A, the processing module 130 adjusts the first initial facial image F1 by loading the automatic adjustment parameter value (e.g. removing freckle parameter value) to make the adjusted facial image F2 achieve the effect of removing freckle (as shown in FIG. 4B). Besides, the processing module 130 further loads the user adjustment parameter value, such as face shape parameter value and a bigger eyes parameter value, to adjust the facial image F2 for generating the adjust facial image F3. In this way, the adjusted facial image F3 achieves the effect of removing freckle, having thinner face, and having bigger eyes in the same time, so as to achieve manipulation effect (as shown in FIG. 4C).

On another aspect, in step S347, the processing module 130 automatically adjusts the first initial facial image by the automatic adjustment parameter value when the processing module 130 determines that the user adjustment parameter value is not received. For example, as shown in FIG. 4A, the processing module 130 adjusts the first initial facial image F1 by loading the automatic adjustment parameter value (e.g. removing freckle parameter value) to make the adjusted facial image F2 achieve the effect of removing freckle (as shown in FIG. 4B). As such, the processing module 130 still can automatically adjust the facial image according to the automatic adjustment parameter value while the user adjustment parameter value is not received. In this way, the method can automatically manipulate the multiple facial images by the pre-configured settings or the preferred configurations of the user. The method above mentioned could reduce the repetitive manipulation operations.

Next, in step S350, the processing module 130 outputs the post-production facial image.

Based on above, by applying the automatic adjustment parameter value, the facial image adjustment system 100 can automatically recommend the preferred manipulation effect or the suitable manipulation effect to the user according to the known behavior of the user or the pre-stored adjustment parameter set, so as to make user can use the simpler steps to finish the manipulation. On another aspect, the user can adjust the current facial image by the user adjustment parameter inputted from the user interface to make the manipulation operations have more flexibility.

On the other hand, in one embodiment, the unknown facial image of the image file can be further processed. In step S330 of FIG. 3A, if the processing module 130 determines that a first initial facial image corresponding to the at least one known facial image is not recognized from the image file, the step S361 in FIG. 3B is performed.

In step S361, the processing module 130 determines that whether the image file includes another initial facial image, and the another initial facial image corresponding to the at least one known facial image is not recognized from the image file. In other words, in step S361, the processing module 130 further recognizes that whether the image file includes another initial facial image and another initial facial image does not belong to the known facial image. If the image file includes another initial facial image, and another initial facial image corresponding to the at least one known facial image is not recognized from the image file, step S363 is performed. Else, the procedure is ended.

In step S363, the processing module 130 is further receives the user adjustment parameter value to adjust another initial facial image and for storing another initial facial image and the user adjustment parameter value to the storing module 120. In one embodiment, the processing module 130 can records the current preferred manipulation of another user. For example, the current preferred manipulation of another user could be the face shape parameter of thinner face effect or thinner chin effect, the parameter of removing bags under the eyes, or the parameter of removing scar, etc.

Therefore, the unknown facial image included in the image file can be stored with the user adjustment parameter value corresponding to the unknown facial image when the processing module 130 determines that the image file includes the unknown facial image. In this way, the processing module 130 can recognize this facial image and recommend the user adjustment parameter value when the image capturing device 110 captures this facial image again.

According to the method above mentioned, the facial image adjustment system 100 can establish the large amount of user face shape database and automatically recommend the suitable manipulation effect according to the adjustment parameter sets stored in the user face shape database corresponding to each one of the user face shapes.

Figure 5:
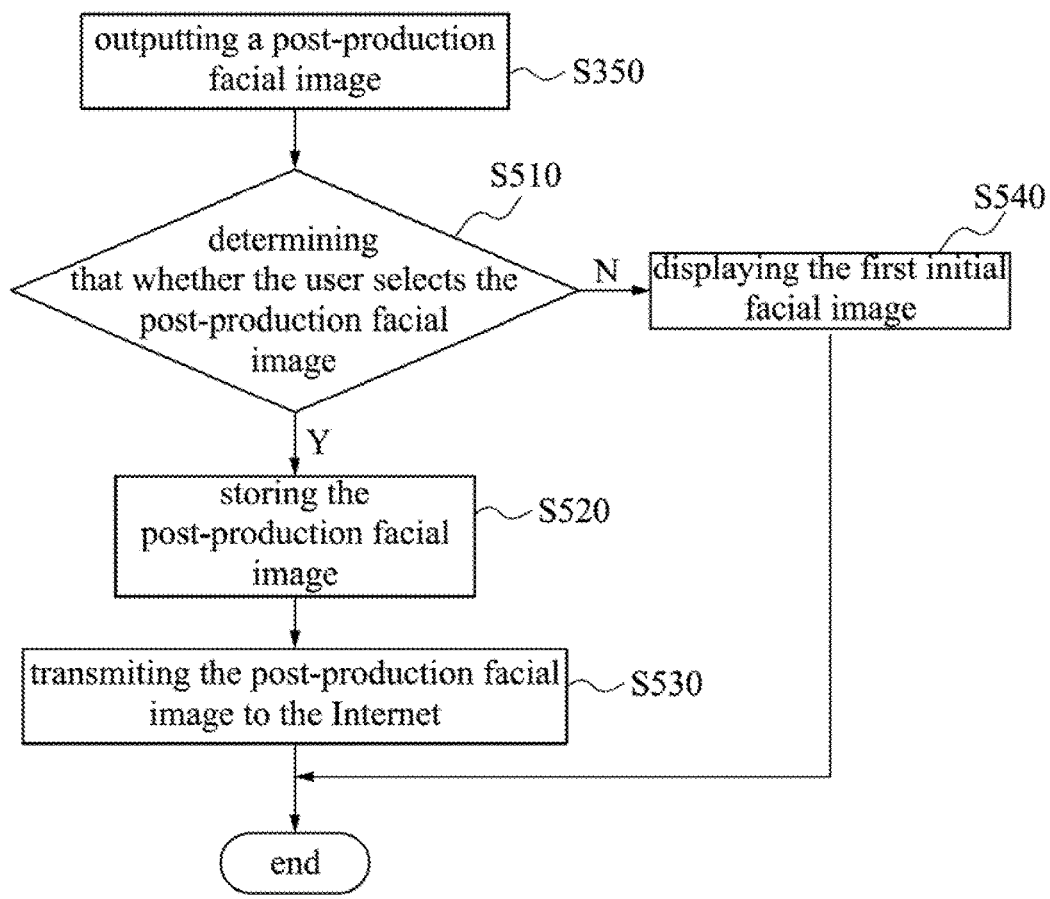
FIG. 5 illustrates a flow chart of a facial image adjustment method according to an embodiment of the present invention.

Please refer to FIG. 5, FIG. 5 illustrates a flow chart of a facial image adjustment method 500 according to an embodiment of the present invention. In this embodiment, the steps S510-S540 can further be performed after step S350. The following paragraphs are described the detail content of the steps S510-S540.

In step S510, the processing module 130 further determines that whether the user selects the post-production facial image. In one embodiment, the user can select the post-production facial image through a user interface. If the processing module 130 determines that the user selects the post-production facial image, the step S520 is performed. If the processing module 130 determines that the user does not select the post-production facial image, the step S540 is performed.

In step S540, the display module 150 displays the first initial facial image. And, the display module 150 is coupled to the processing module 130.

On another aspect, in step S520, the processing module 130 enables the storage module 120 to store the post-production facial image.

Besides, in one embodiment, the step S530 can be selectively performed. In step S530, the transmission module 140 transmits the post-production facial image stored in the storage module 120 to the Internet. And, the transmission module 140 coupled to the processing module 130. Therefore, the post-production facial image can be transmitted to the other applications or web pages through Internet. For example, the other applications can be Facebook, Line, WeChat, etc.

Therefore, through the facial image adjustment system and facial image adjustment method, the facial image adjustment system can recognize the known user. And then, the facial image adjustment system can conveniently apply the stored adjustment parameter set to directly manipulate the image file or recommend the preferring adjustment parameter of the user, so as to output a post-production facial image. As such, the inconvenience that causing by repetitively selecting the adjustment parameter values for manipulating multiple images corresponding the same person can be reduced. And, it also provides the convenient way for user to manipulate the image files.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A facial image adjustment system, comprising:
   an image capturing device for obtaining an image file;
   a storage, coupled to the image capturing device, and for storing at least one known facial image and at least one adjustment parameter set corresponding to the at least one known facial image; and
   a processor, coupled to the image capturing device and the storage;
   wherein the image file comprises a second initial facial image,
   in response to that the second initial facial image fails to match any of the at least one known facial image, the processor further receives a user adjustment parameter value to adjust the second initial facial image, and enables the storage to store the user adjustment parameter value as one of the at least one adjustment parameter set and to store a face in the second initial facial image as a new known face;
   wherein the image capturing device obtains another image file, and the processor recognizes whether a third initial facial image in the another image file matches the new known face; and
   wherein in response to that the third initial facial image matches the new known face, the processor automatically adjusts the third initial facial image according to the user adjustment parameter value, so as to output a post-production facial image.

2. The facial image adjustment system of claim 1, wherein the at least one adjustment parameter set comprises an automatic adjustment parameter value and a user adjustment parameter value, and the automatic adjustment parameter value or the user adjustment parameter value comprises at least one adjustment parameter value.

3. The facial image adjustment system of claim 2, wherein the at least one adjustment parameter value comprises a brightness parameter value, a smoothing parameter value and a coloring parameter value.

4. The facial image adjustment system of claim 2, wherein the processor adjusts the third initial facial image by loading the user adjustment parameter value.

5. The facial image adjustment system of claim 1, wherein the processor obtains at least one facial characteristic of the second initial facial image, wherein the at least one facial characteristic comprises an inner side distance of eyes, a left side and right side distance of nose, a freckle position or a left side and right side distance of mouth corner.

6. The facial image adjustment system of claim 5, wherein the processor further recognizes whether the second initial facial image matches the at least one known facial image stored in the storage according to the at least one facial characteristic of the second initial facial image.

7. The facial image adjustment system of claim 1, wherein the processor further determines whether the post-production facial image is selected, and in response to that the post-production facial image is selected, the storage stores the post-production facial image.

8. A facial image adjustment method, comprising:
obtaining an image file by an image capturing device, wherein the image file comprises a second initial facial image;
storing at least one known facial image and at least one adjustment parameter set corresponding to the at least one known facial image by a storage;
in response to that the second initial facial image fails to match any of the at least one known facial image, receiving a user adjustment parameter value corresponding to the second initial facial image;
adjusting the second initial facial image according to the user adjustment parameter value;
storing the user adjustment parameter value as one of the at least one adjustment parameter set and storing a face in the second initial facial image as a new known face;
obtaining another image file by the image capturing device;
recognizing whether a third initial facial image in the another image file matches the new known face; and
automatically adjusting the third initial facial image by a processor according to the user adjustment parameter value in response to that the third initial facial image matches the new known face, so as to output a post-production facial image.

9. The facial image adjustment method of claim 8, wherein the at least one adjustment parameter set comprises an automatic adjustment parameter value and a user adjustment parameter value, and the automatic adjustment parameter value or the user adjustment parameter value comprises at least one adjustment parameter value.

10. The facial image adjustment method of claim 9, wherein the at least one adjustment parameter value comprises a brightness parameter value, a smoothing parameter value and a coloring parameter value.

11. The facial image adjustment method of claim 9, further comprising:
loading the user adjustment parameter value to adjust the second initial facial image.

12. The facial image adjustment method of claim 8, further comprising:
obtaining at least one facial characteristic of the second initial facial image;
wherein the at least one facial characteristic comprises an inner side distance of eyes, a left side and right side distance of nose, a freckle position or a left side and right side distance of mouth corner.

13. The facial image adjustment method of claim 12, further comprising:
recognizing whether the second initial facial image matches the at least one known facial image stored in the storage according to the at least one facial characteristic of the second initial facial image.

14. The facial image adjustment method of claim 13, further comprising:
determining whether the post-production facial image is selected; and
in response to that the post-production facial image is selected, the storage storing the post-production facial image.

15. The facial image adjustment method of claim 13, further comprising:
transmitting the post-production facial image stored in the storage to the Internet; and
displaying the third initial facial image in response to that the processor determines the post-production facial image is not selected.

* * * * *